US010406770B2

(12) United States Patent
Stuckey et al.

(10) Patent No.: US 10,406,770 B2
(45) Date of Patent: Sep. 10, 2019

(54) METHOD OF APPLYING A POST CURE LAMINATE TO A TIRE

(71) Applicant: Bridgestone Americas Tire Operations, LLC, Nashville, TN (US)

(72) Inventors: Jon I. Stuckey, Uniontown, OH (US); Robert G. Barned, Akron, OH (US); James M. Kirby, Akron, OH (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 0 days.

(21) Appl. No.: 15/532,514

(22) PCT Filed: Nov. 17, 2015

(86) PCT No.: PCT/US2015/061048
§ 371 (c)(1),
(2) Date: Jun. 2, 2017

(87) PCT Pub. No.: WO2016/105699
PCT Pub. Date: Jun. 30, 2016

(65) Prior Publication Data
US 2017/0355159 A1     Dec. 14, 2017

Related U.S. Application Data

(60) Provisional application No. 62/095,463, filed on Dec. 22, 2014.

(51) Int. Cl.
*B29D 30/54* (2006.01)
*B29D 30/16* (2006.01)

(52) U.S. Cl.
CPC .............. *B29D 30/54* (2013.01); *B29D 30/16* (2013.01); *B29D 2030/544* (2013.01)

(58) Field of Classification Search
CPC .................................................... B29D 30/54
See application file for complete search history.

(56) References Cited

U.S. PATENT DOCUMENTS

| 3,136,673 A * | 6/1964 | Carver ................... B29D 30/56 |
| | | 156/96 |
| 3,903,947 A | 9/1975 | Emerson |
| 3,940,463 A | 2/1976 | Nicholson |
| 4,089,360 A | 5/1978 | Bohm |
| 4,111,732 A | 9/1978 | MacMillan |
| 4,151,027 A | 4/1979 | Schelkmann et al. |
| 4,158,378 A | 6/1979 | Pearson et al. |
| 4,178,198 A * | 12/1979 | Kent ..................... B29D 30/08 |
| | | 156/127 |
| 5,055,148 A | 10/1991 | Lindsay et al. |
| 5,503,940 A | 4/1996 | Majumdar et al. |
| 6,082,423 A * | 7/2000 | Roesgen ................... B60C 9/09 |
| | | 152/209.1 |
| 7,306,019 B2 | 12/2007 | Kurokawa |
| 8,388,784 B2 | 3/2013 | D'Sidocky et al. |
| 8,602,075 B2 | 12/2013 | Albert et al. |
| 8,614,276 B2 | 12/2013 | Voge et al. |
| 8,679,608 B2 | 3/2014 | Lesage et al. |
| 2002/0033557 A1 | 3/2002 | Hashimura et al. |
| 2005/0211351 A1 | 9/2005 | Majumdar |
| 2007/0256771 A1 | 11/2007 | Balogh |
| 2010/0154948 A1 | 6/2010 | Dahlberg et al. |
| 2014/0034199 A1 | 2/2014 | Buxton et al. |

FOREIGN PATENT DOCUMENTS

| EP | 1125964 A2 | 8/2001 | |
| GB | 555690 A * | 9/1943 | ............. B29D 30/54 |
| GB | 555690 A | 9/1943 | |
| JP | 2009-149034 | 7/2009 | |
| JP | 2013-010295 | 1/2013 | |
| KR | 10-0297446 | 11/2001 | |

OTHER PUBLICATIONS

English Abstract of KR 10-0297446, issued on Nov. 5, 2001.
English Abstract of JP 2009-149034, issued on Jul. 9, 2009.
English Abstract of JP 2013-010295, issued on Jan. 17, 2013.
Kopp, Christian, Extended European Search Report from European Application No. 15873920.1, 4 pp (dated Jun. 22, 2018).

* cited by examiner

*Primary Examiner* — Daniel H Lee

(57) ABSTRACT

A method of applying a laminate to a tire includes pre-treating a portion of the tire and placing the laminate on at least the pre-treated portion of the tire. The method further includes placing an electrical heating element on top of the laminate and placing a pressure element over the electrical heating element and the laminate. The method also includes applying heat and pressure to the laminate using the electrical heating element and the pressure element to permanently adhere the laminate to the tire.

20 Claims, 4 Drawing Sheets

METHOD OF APPLYING A POST CURE LAMINATE TO A TIRE

FIELD OF INVENTION

The present disclosure relates to a tire having a laminate disposed thereon and to methods of its preparation. More particularly, the present disclosure relates to various methods for applying an uncured laminate to one or more portions of a cured tire.

BACKGROUND

Applying compound laminates to tires can alter the performance characteristics of the tire. Existing methods for applying an uncured compound laminate to a tire requires expensive and specialized equipment. Existing methods may be improved by providing a simplified method that uses inexpensive equipment to reduce the cost.

SUMMARY

In one embodiment, a method of applying a laminate to a cured tire includes providing a cured tire and pre-treating a portion of a tread of a tire. The method further includes providing a laminate, placing the laminate on the pre-treated portion of the tread of the tire, and placing an electrical heating element on a top of the laminate. The method also includes placing a toroidal air bag over the electrical heating element and the laminate and pressurizing the toroidal air bag. The method further includes applying heat sufficient to cure the laminate with the electrical heating element, thereby permanently affixing the laminate to the tire. The laminate alters performance characteristics of the tire when affixed to the tire.

In another embodiment, a method of applying a laminate to a tire includes placing a laminate on a portion of a tire, placing an electrical heating element on top of the laminate, and placing a pneumatic pressure element over the electrical heating element and the laminate. The method also includes applying heat to the laminate using the electrical heating element and applying pressure to the laminate using the pneumatic pressure element, to permanently adhere the laminate to the tire.

In yet another embodiment, a method of applying a laminate to a tire includes pre-treating a portion of the tire and placing the laminate on at least the pre-treated portion of the tire. The method further includes placing an electrical heating element on top of the laminate and placing a pressure element over the electrical heating element and the laminate. The method also includes applying heat and pressure to the laminate using the electrical heating element and the pressure element to permanently adhere the laminate to the tire.

BRIEF DESCRIPTION OF THE DRAWINGS

In the accompanying drawings, structures are illustrated that, together with the detailed description provided below, describe exemplary embodiments of the claimed invention. Like elements are identified with the same reference numerals. It should be understood that elements shown as a single component may be replaced with multiple components, and elements shown as multiple components may be replaced with a single component. The drawings are not to scale and the proportion of certain elements may be exaggerated for the purpose of illustration.

DETAILED DESCRIPTION

The following includes definitions of selected terms employed herein. The definitions include various examples or forms of components that fall within the scope of a term and that may be used for implementation. The examples are not intended to be limiting. Both singular and plural forms of terms may be within the definitions.

"Axial" and "axially" refer to a direction that is parallel to the axis of rotation of a tire.

"Equatorial plane" refers to the plane that is perpendicular to the tire's axis of rotation and passes through the center of the tire's tread.

"Radial" and "radially" refer to a direction perpendicular to the axis of rotation of a tire.

"Sidewall" refers to that portion of the tire between the tread and the bead.

"Tread" as used herein, refers to that portion of the tire that comes into contact with the road or ground under normal inflation and load.

Directions are stated herein with reference to the axis of rotation of the tire. The terms "upward" and "upwardly" refer to a general direction towards the tread of the tire, whereas "downward" and "downwardly" refer to the general direction towards the axis of rotation of the tire. Thus, when relative directional terms such as "upper" and "lower" or "top" and "bottom" are used in connection with an element, the "upper" or "top" element is spaced closer to the tread than the "lower" or "bottom" element. Additionally, when relative directional terms such as "above" or "below" are used in connection with an element, an element that is "above" another element is closer to the tread than the other element.

Figure 1:
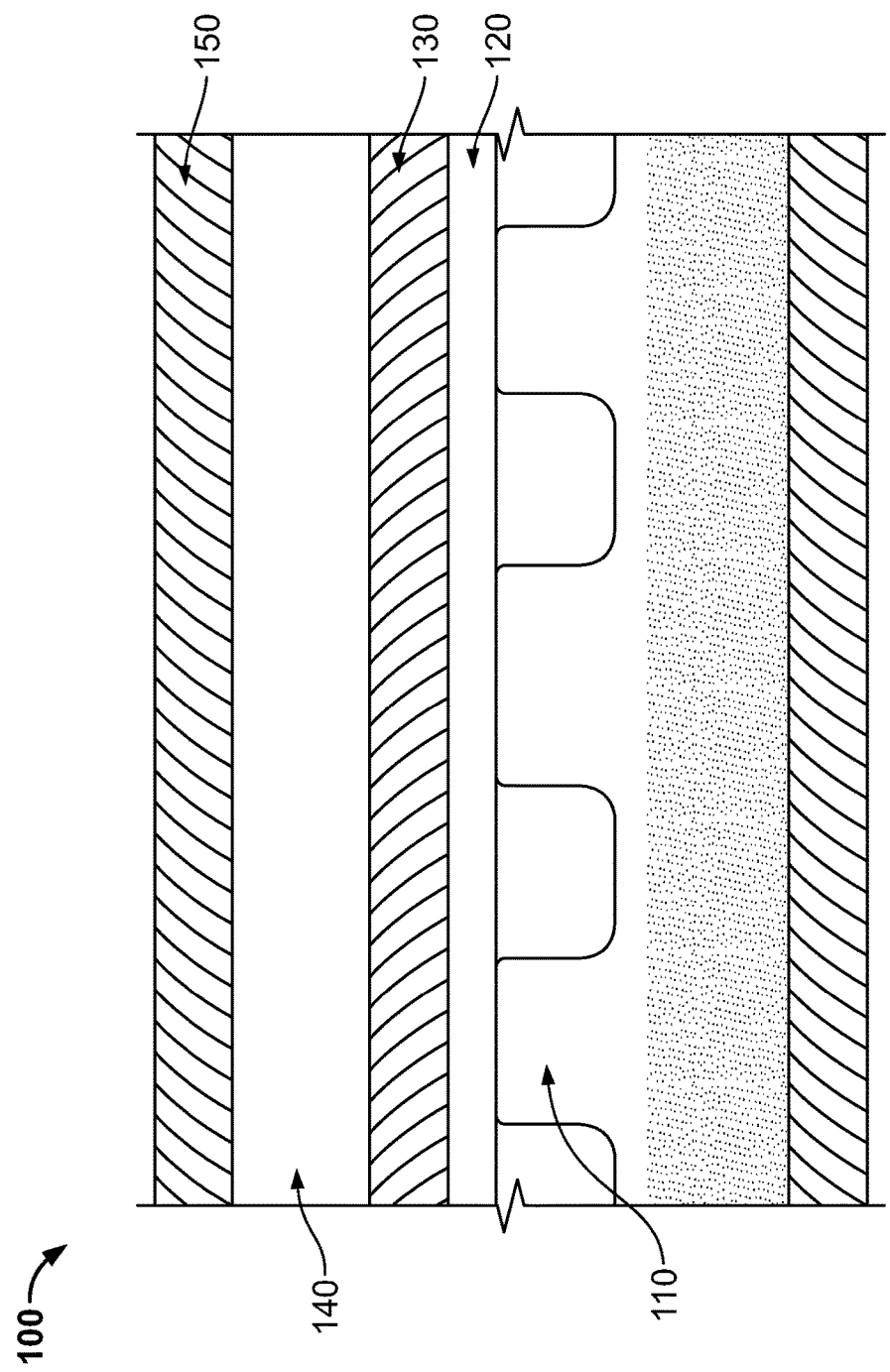
FIG. 1 is a side view of one embodiment of an assembly for applying a laminate to a tire.

The terms "inward" and "inwardly" refer to a general direction towards the equatorial plane of the tire, whereas "outward" and "outwardly" refer to a general direction away from the equatorial plane of the tire and towards the sidewall of the tire. Thus, when relative directional terms such as "inner" and "outer" are used in connection with an element, the "inner" element is spaced closer to the equatorial plane of the tire than the "outer" element FIG. 1 depicts one embodiment of an assembly for applying a laminate to a tire 100. Initially, the components of the assembly will be described individually to provide context for a description of the method.

The tire 100 is a cured tire having a circumferential tread 110. The tire 100 can be any type of tire, including but not limited to a tire for an automobile, a truck a motorcycle, an airplane, agriculture equipment, or mining equipment. Although not shown in FIG. 1, tire 100 also includes shoulder regions connecting the tread to sidewalls of the tire, and bead regions located at a radially lower end of the sidewalls.

A separate layer of a laminate compound 120 is placed on a surface of the tire 100. The embodiment of FIG. 1 depicts the laminate compound 120 being applied to a tread 110 of the tire 100. In alternative embodiments (not shown), the laminate compound 120 may be applied to the shoulder regions, sidewalls, bead regions, or a combination thereof.

The laminate compound 120 can be made from an elastomeric or polymeric material, including, without limitation, natural rubber, synthetic polyisoprene, polybutadiene, styrene butadiene, thermoplastic, polyurethane, and combinations thereof. and the laminate compound 120 has the effect of changing the performance properties of tire 100 when affixed to a tread surface of tire 100. The material properties of the laminate may be varied according to the vehicle type, and the expected use of the tire. In one embodiment, the laminate has a thickness of less than 1.5 millimeters. In another embodiment, the laminate has a thickness of 1.0 to 1.5 millimeters. However, it should be understood that thicker laminates may be employed. The thickness of the laminate may be exaggerated in the drawings for illustrative purposes. The laminate compound 120 may further be partially crosslinked by heat or radiation prior to being placed on top of the surface of the tire. The cross linking provides dimensional stability during processing.

Further, laminate compound 120 may be precut to correspond to surface features of the tire, such as grooves or sipes in the tread, lettering in the sidewalls, or protruding ribs on the sidewalls. Pre-cutting the laminate reduces bridging of pattern feature of the original tire 100.

A heating element 130 is placed above the laminate compound 120. The heating element 130 can be a high temperature heating pad, for example. The heating element 130 should provide heat at a temperature suitable for conventional cure systems, which generally fall within the range of 130-170° C. In alternative embodiments, the temperature may be as high as 200° C. or higher. Heating element 130 may further take the form of a custom geometry flexible heater, suitable for a particular application. For example heating element 130 can be manufactured to match the geometry of tire 100.

Heating element 130 may provide heat by convection, conduction, radiation, or any combination thereof. For example, heating element 130 may include an electrical heating system that provides heat through radiation and conduction.

A pressure element 140 is disposed above the heating element 130. Pressure element 140 can be, for example, a pneumatic pressure element such as an air bag. The pressure element provides sufficient pressure to hold the heating element 130 and laminate compound 120 in place. A minimum pressure is needed for contact and to keep volatile ingredients in solution when the compound temperature is raised. In one embodiment, the pressure element provides between 50-300 PSI (300-2000 kPa) of pressure. In one particular embodiment, the pressure element provide 80 PSI (600 kPa) of pressure. In alternative embodiments, the pressure element may provide more the 300 PSI of pressure.

Pressure element 140 may take any geometric shape sufficient for a particular application. For example, the pressure element may have a toroid or a flat rectangular shape.

A retaining element 150 is located above pressure element 140, to hold pressure element in place during the method of the present embodiment. In one embodiment, the retaining element is a series of elastic bands. In alternative embodiments, the retaining element includes one or more clamps, plates, inelastic bands, or other retaining elements to oppose the force from the pressure element.

In an alternative embodiments (not shown), the system may be employed to apply a replacement tread to a tire carcass, instead of applying a laminate compound to a tire tread. In such an embodiment, a new green tread will be applied to a tread surface of a cured tire, and then affixed using the same methods described above. Alternatively, the new tread may be partially or fully cured. Such a procedure may be useful, for example, if part or all of the cured tire's original tread has been worn down.

Figure 2:
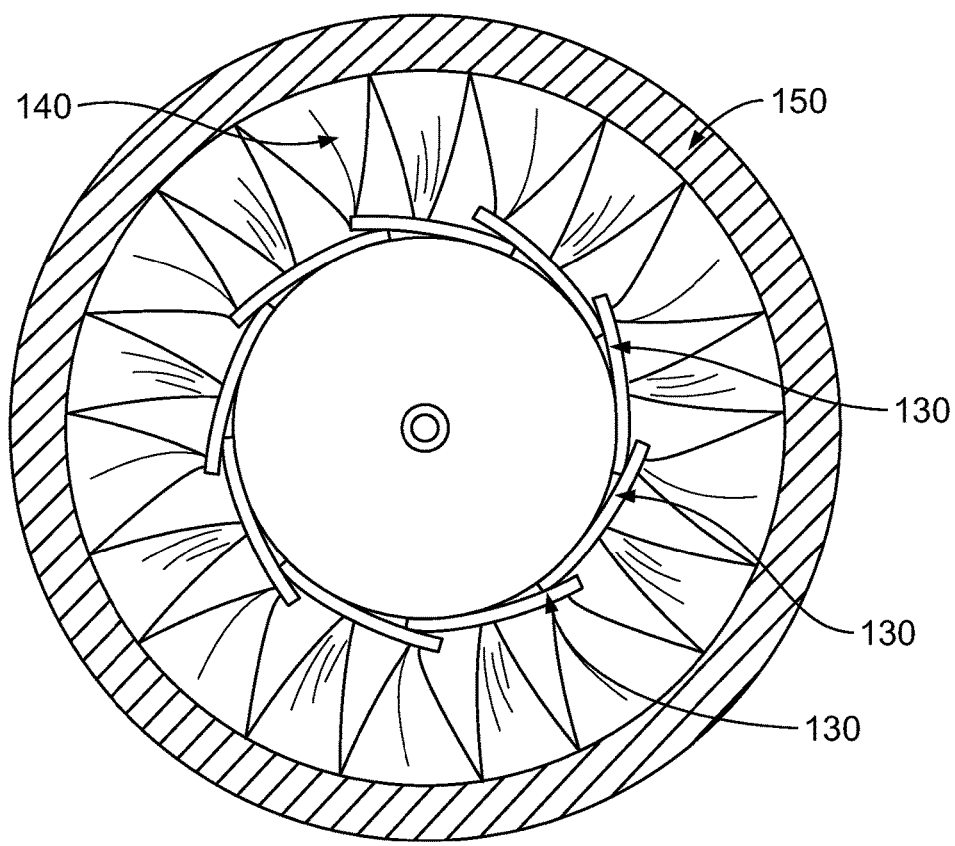
FIG. 2 is a side view of the assembly of FIG. 1.
Figure 3:
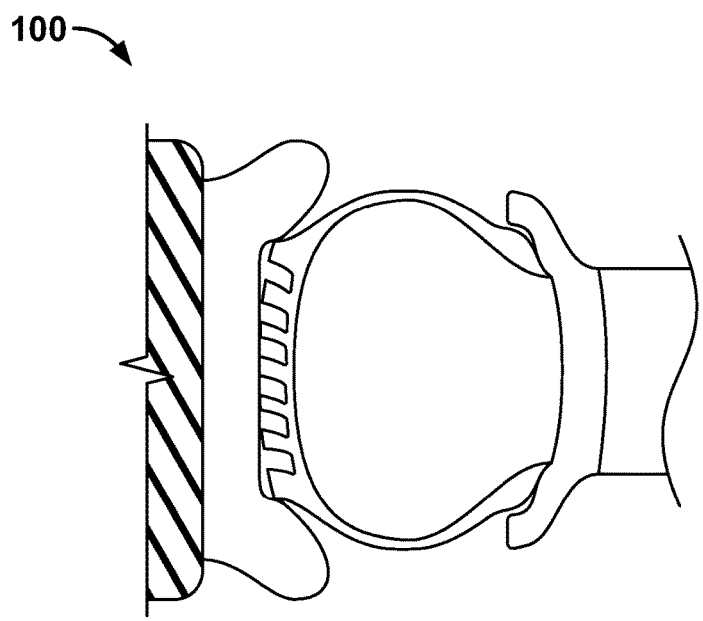
FIG. 3 is a front cross section view of the assembly of FIG. 1.

FIGS. 2 and 3 depict a side and a front view, respectively of the assembly of FIG. 1. The assembly will be described with reference to both FIGS. 2 and 3. As can be seen from this view, the pressure element 140 has multiple heating elements 130 disposed on an inner circumference thereof. Pressure element 140 in this embodiment takes the form of a pleated toroidal air bag. The retaining element 150 takes the form of an outer ring, surrounding an outer surface of the pressure element 140. In alternative embodiments (not shown), there may be only one heating element located on an inner circumference of the assembly, or different arrangements of multiple heating elements.

Figure 4:
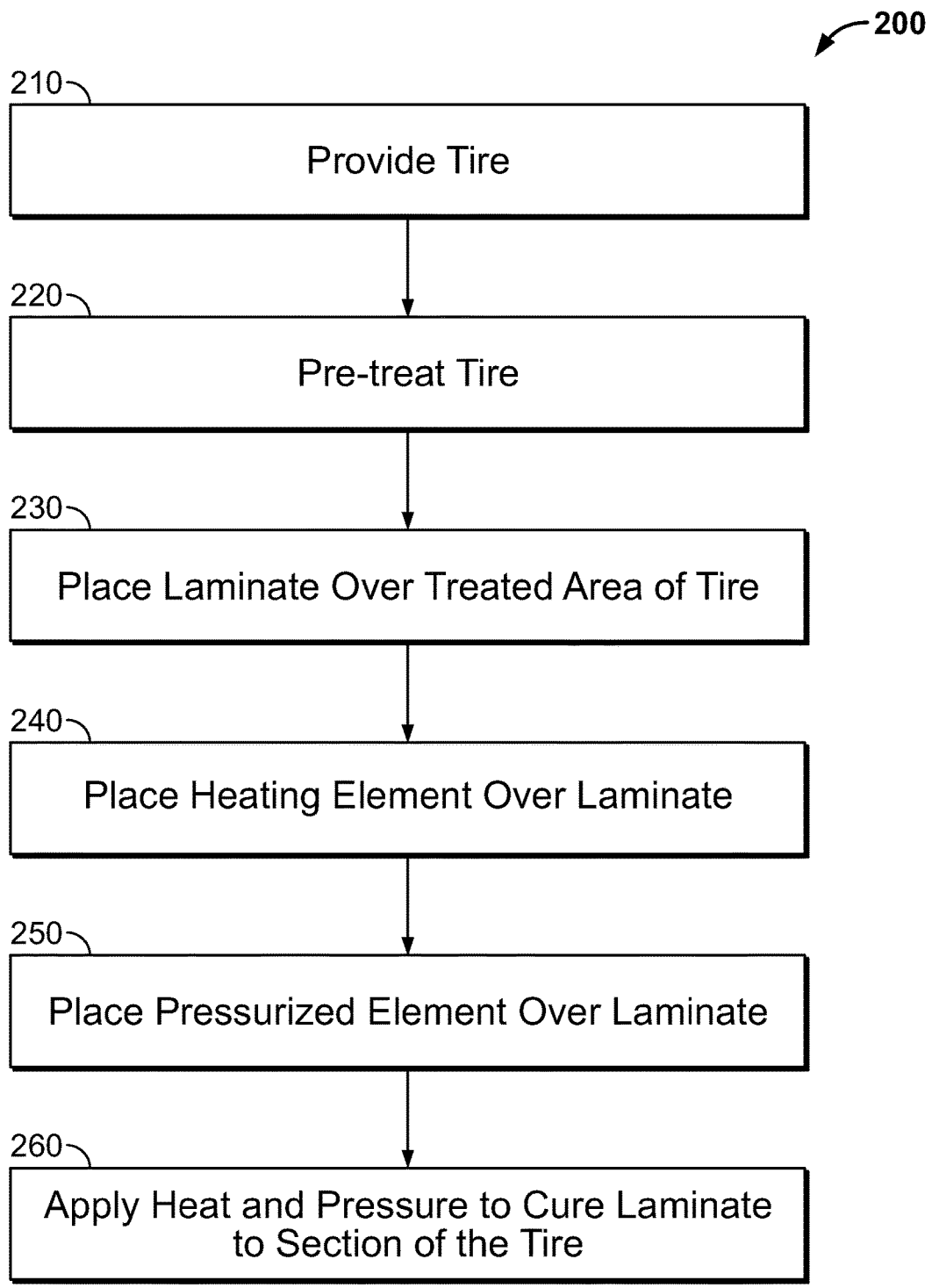
FIG. 4 is a flow chart of one embodiment of a method of applying a laminate to a tire.

FIG. 4 is a flowchart depicting a method 200 of applying a laminate to a tire. The method 200 may be performed at a tire manufacturing facility. Alternatively, the method 200 may be performed at a tire maintenance, retreading, or repair facility, or at a retail establishment.

Initially, a tire is provided (step 210). In one embodiment, the tire is a new tire. In an alternative embodiment, the tire is a used tire that has been partially or fully worn.

The surface of the tire undergoes a pre-treatment process for receiving a laminate (step 220). The pre-treatment can include one or more of: cleaning, buffing, adding a cement layer, oxidizing (e.g. plasma treatment, oxidizing chemicals treatment (e.g. halohydantoins, etc.)), or applying a chemical treatment to break sulfur cross links. The pre-treatment will be performed on any surface of the tire on which laminate will be affixed. These surfaces include one or more of the tread, sidewalls, shoulders, or bead regions. In an alternative embodiment, the pre-treatment process may be shortened or omitted entirely. For example, it may not be necessary to clean the surface of a new tire.

After the tire 100 has been pre-treated, a laminate compound is placed over the pre-treated area in step 230. After placing the laminate compound on the tire 100, the laminate may be pressed onto the cured tire with one or more rollers. Such a process may be referred to as "stitching" and may expel air or other gasses that become trapped between the laminate and the cured tire. A heating element 130 and a pressure element 140 are then placed on top of the laminate in steps 240 and 250, respectively.

Once the elements are arranged as desired, the pressure element 140 is pressurized and heating element 130 is engaged to generate heat in step 260. The pressure and heat work to cure the laminate compound 120 and permanently affix the laminate compound 120 to tire 100.

Figure 5:
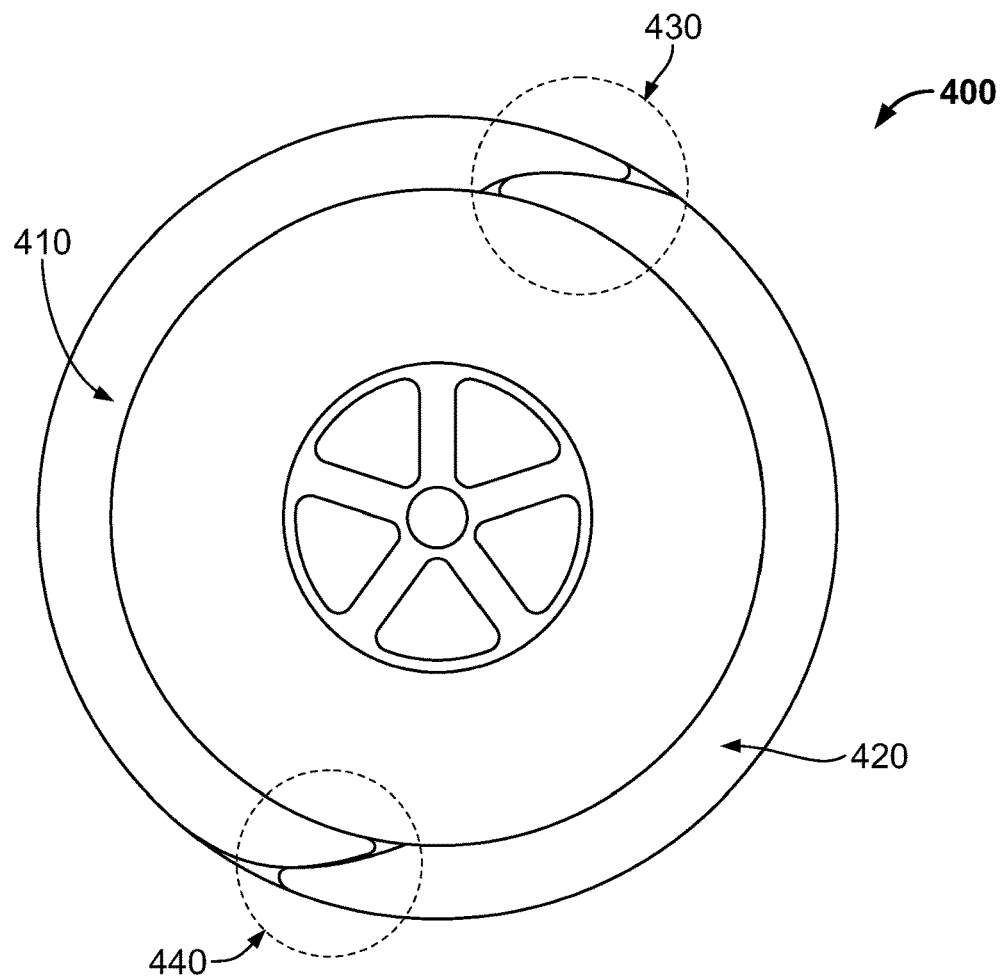
FIG. 5 is a side view of an alternative pressure element that may be used in the method of FIG. 1.

An alternative pressure element 400 is shown in FIG. 5. In this embodiment, pressure element 400 includes two air bags 410 and 420. Each air bag will extend laterally across an entire tread width, but will only extend circumferentially around half of the tire. The air bags 410 and 420 overlap at two interfaces 430 and 440. In alternative embodiments (not shown), the air bags can cover less than an entire tread width. In still other alternative embodiments, three or more pressurizing elements may be used.

Figure 6:
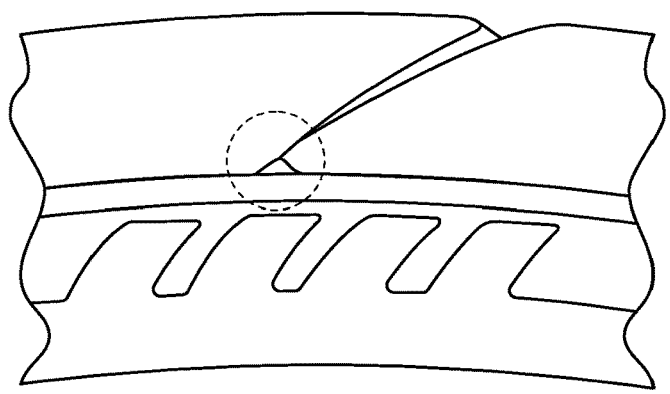
FIG. 6 is a front section view of the alternative pressure element of FIG. 5.

FIG. 6 shows a detail view of the pressure element 400 of FIG. 5. As can be seen from this view, a gap G may form at an interface 430 between the air bags 410, 420. Such a gap may form if the air bags 410, 420 do not have corresponding surfaces, or if the air bags 410, 420 are not filled to a sufficient pressure. The gap may be reduced or eliminated entirely by employing air bags having corresponding ends, and by sufficiently pressurizing the air bags.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Gamer, A Dictionary of Modern Legal Usage 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components.

While the present disclosure has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the disclosure, in its broader aspects, is not limited to the specific details, the representative apparatus and method, and illustrative examples shown and described. Accordingly, departures may be made from such details without departing from the spirit or scope of the applicant's general inventive concept.

What is claimed is:

1. A method of applying a laminate to a cured tire, comprising:
    providing the cured tire, the cured tire having a tread with a plurality of ribs and grooves;
    pre-treating a portion of the tread of the cured tire, including pre-treating a portion of at least one of the plurality of ribs;
    providing an uncured laminate having a thickness of less than 1.5 mm;
    placing the laminate on the pre-treated portion of the tread of the cured tire, including applying the laminate to the at least one of the plurality of ribs;
    placing an electrical heating element on a top of the laminate;
    placing a toroidal air bag over the electrical heating element and the laminate;
    pressurizing the toroidal air bag;
    applying heat sufficient to cure the laminate with the electrical heating element, thereby permanently affixing the laminate to the cured tire, wherein the laminate alters performance characteristics of the cured tire when affixed to the cured tire.

2. The method of claim 1, wherein the pre-treating includes at least one of:
    cleaning, buffing, adding a cement layer, surface treatment by oxidizing methods, and chemical treatment.

3. The method of claim 1, wherein the laminate is crosslinked by applying heat or radiation to the laminate.

4. A method of applying a laminate to a cured tire having a tread with a plurality of ribs and grooves, comprising:
    placing a laminate on a portion of at least one of the plurality of ribs of the tread of the cured tire, the laminate having a thickness of less than 1.5 mm;
    placing an electrical heating element in contact with a top of the laminate;
    placing a pneumatic pressure element over the electrical heating element and the laminate;
    applying heat to the laminate using the electrical heating element; and
    permanently adhering the laminate to the portion of the cured tire by applying pressure to the laminate with the pneumatic pressure element.

5. The method of claim 4, wherein the pneumatic pressure element is an air bag.

6. The method of claim 5, wherein the air bag is a toroidal air bag.

7. The method of claim 4, wherein the pneumatic pressure element provides a pressure of 80 pounds per square inch.

8. The method of claim 4, wherein the laminate does not cover the entire cured tire.

9. The method of claim 8, wherein the heat is applied only to the portion of the cured tire where the laminate is located.

10. The method of claim 4, wherein the laminate is only applied to a tread portion of the cured tire.

11. A method of applying a laminate to a cured tire having a tread with a plurality of ribs and grooves, comprising:
    pre-treating a portion of at least one of the plurality of ribs of the tread of the cured tire;
    placing the laminate on at least the pre-treated portion of the at least one of the plurality of ribs of the tread of the cured tire;
    placing an electrical heating element on top of the laminate;
    placing a pressure element over the electrical heating element and the laminate; and
    applying heat and pressure to the laminate using the electrical heating element and the pressure element to permanently adhere the laminate to the cured tire.

12. The method of claim 11, wherein the pre-treating includes one or more of:
    cleaning, buffing, adding a cement layer, surface treatment by oxidizing methods, and chemical treatment.

13. The method of claim 11, further comprising pre-treating a portion of a sidewall of the cured tire.

14. The method of claim 11, further comprising pre-treating a portion of a shoulder of the cured tire.

15. The method of claim 11, wherein the pressure element provides a pressure of 80 pounds per square inch.

16. The method of claim 11, wherein the cured tire is pre-treated at a plurality of locations, and a plurality of laminates are applied to the plurality of pre-treated locations.

17. The method of claim 16, further comprising pressing the laminate onto the pre-treated portion of the cured tire with one or more rollers.

18. The method of claim 11, wherein the laminate is only applied to a portion of a tread of the cured tire.

19. The method of claim 11, wherein the electrical heating element is placed only on the laminate, and does not heat portions of the cured tire that are not pre-treated.

20. The method of claim 11, wherein crosslinking is performed by heat or radiation.

* * * * *